United States Patent

Hardin

[11] 3,791,659
[45] Feb. 12, 1974

[54] EXPANDABLE CHUCK OR MANDREL

[75] Inventor: William Medford Hardin, Clyde, N.C.

[73] Assignee: Champion International Corporation, Hamilton, Ohio

[22] Filed: Nov. 17, 1972

[21] Appl. No.: 307,659

[52] U.S. Cl............................ 279/2, 279/121, 82/44
[51] Int. Cl............................................. B23b 31/42
[58] Field of Search............ 279/2, 121, 110; 82/44; 242/46.3, 46.4, 72.1

[56] References Cited
UNITED STATES PATENTS
1,919,239  7/1933  McFall.................................. 82/44
2,727,700  12/1955  Van Colle et al.................. 242/72.1

Primary Examiner—Francis S. Husar
Attorney, Agent, or Firm—Gardiner, Sixbey, Bradford & Carlson

[57] ABSTRACT

An expandable chuck or mandrel is especially well suited for use in winding and machines of the sort used in paper manufacturing operations has a stepped spindle located within the borehole of the mandrel body which spindle provides tapered cam surfaces which cause the mandrel jaws to expand and contract responsive to reciprocal movement of the body of the mandrel on the spindle or vice versa.

6 Claims, 4 Drawing Figures

PATENTED FEB 12 1974 3,791,659

EXPANDABLE CHUCK OR MANDREL

SUMMARY AND BACKGROUND OF THE INVENTION

This invention relates to improvements in an expandable chuck or mandrel. One aspect of the invention relates to an expandable chuck or mandrel having a stepped spindle located within a correspondingly shaped borehole of the mandrel and arranged for use in winding operations of the sort found in paper manufacturing in connection with which by way of example but not limitation, the invention will be described.

The chuck or mandrel as used in winding operations is a means for supporting a roll of paper. The core upon which the roll is mounted is a hollow structure member made of metal, spiral wound heavy paperboard, or other suitable materials. The mandrel is inserted in the hollow part of the core, expanded to seize the same rigidly, and then the winding machine or winding operation is started. Since many of these operations are at very high lineal speeds, e.g., up to 5,000 feet per minute, considerable stress is placed on the mandrel as it is the principal mechanical connection between the roll of paper which can weigh up to 3000 lbs. and the winding machine.

A chuck may fail due to various structural deficiencies and it is, therefore, commonplace to maintain an inventory of spare parts and perhaps even of spare chucks. Additionally, the various sizes of cores employed around paper mills or specified by customers of such mills, requires a variety of different diameters of chucks to be maintained. Many such chucks are heavy and cumbersome to change, a problem which is compounded when there is a failure of one of these devices.

Representative prior art patents are Vancolle et al, 2,727,700 and K. J. Gerrits 3,331,565.

The present invention is directed to the problems found in prior art mandrels. These problems have been either eliminated or significantly reduced by use of improved structure which has provided a lighter weight mandrel that is easier to handle and provides better and longer service. An appreciable reduction in inventory of repair parts and spare mandrels resulted from using the present invention. There are various novel features which in combination provide a mandrel of great strength, e.g., I have a stepped spindle which allows increase of diameter at the end where the cantilever-supported mandrel joins to the winding machine. Additionally, heat treatment of certain critical parts of the mandrel have reduced failures due to embrittlement and reduced damage to cores (sometimes customer's cores) due to failure of mandrels.

One object of the invention is to provide an improved chuck or mandrel. A further object is to provide an improved chuck or mandrel suited for winding operations.

Other advantages, objects, features and the like will become apparent from a reading of the following disclosure in connection with the annexed drawings wherein.

Figure 1:
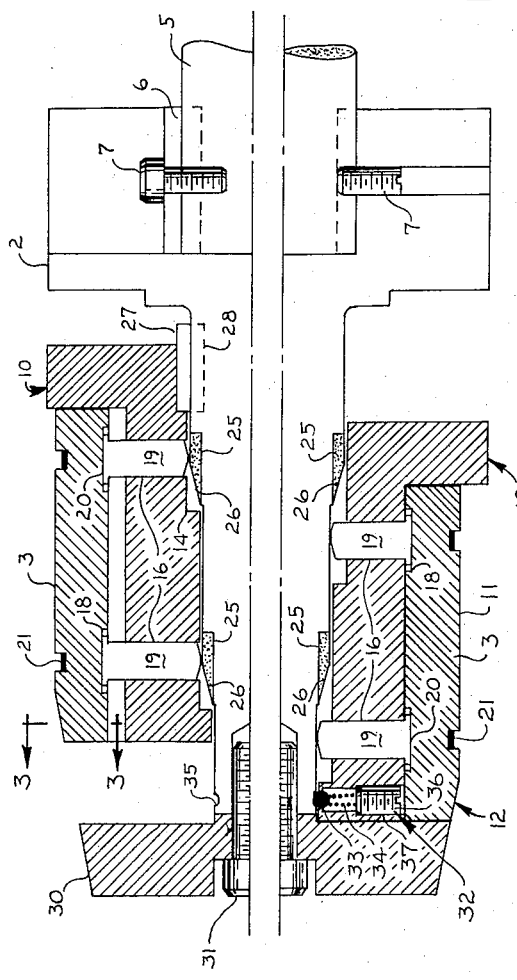
FIG. 1 is a split side cross section of my mandrel mounted on a winder shaft; the top half of this section shows the mandrel expanded (as on section 1—1 of FIG. 2); the bottom half shows in section the mandrel contracted.
Figure 4:
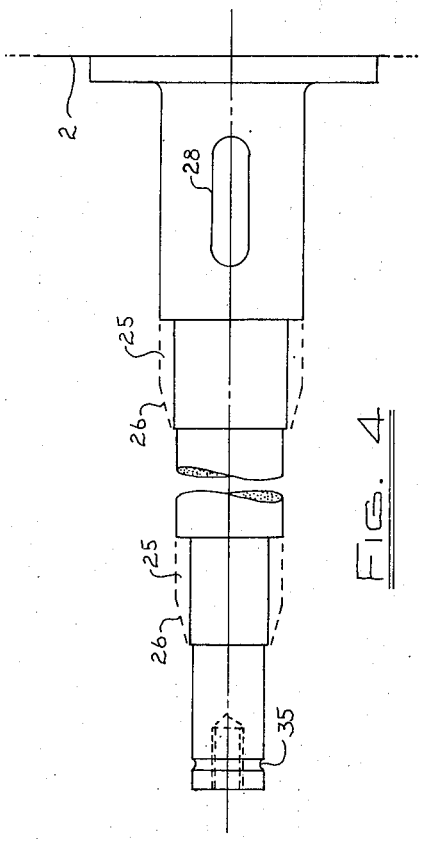
FIG. 4 shows the spindle.

As seen in FIG. 1 the mandrel or chuck 1 of the present invention is an assembly of elements so constructed and arranged that reciprocating motion of the spindle 2 relative to the rest of the chuck will cause an expansion or contraction, as the case may be, of the chuck jaws 3. The spindle at its innermost end is mounted on the shaft 5 of a winding machine by any suitable means and prevented from rotating relative thereto by suitable keys 6, set screws 7 or splines or the like.

The chuck comprises a chuck body 10 which advantageously can be machined from one piece of a suitable tool steel, preferably of a Brinell hardness in the range from about 425 to 430. This body is substantially cylindrical on its external surface 11 but is slightly tapered at its outermost end 12 for ease of moving the same into a core. The chuck body also has an internally stepped substantially circular borehole 14 that decreases in diameter as it approaches the outermost or unsupported end. The decreases are in stepwise increments as is apparent both from the drawing and further description below. On the external surface are a plurality of substantially equally spaced jaw slots 15, each of which extends longitudinally as is of a size and shape to receive one of the chuck jaws 3. A passage 16 extends radially from each jaw slot into the borehole. Preferably, there are radial passages 16 arranged at the inner and outer ends of the jaw slot for reasons which will become apparent below.

As already noted, a chuck jaw 3 is mounted within each jaw slot of the body. In the preferred embodiment are four jaw slots 15 and, therefore, the chuck 1 has four chuck jaws. These jaws are each arranged to move radially in and out of their slot. Each jaw 3 has an external contour which, when fully retracted within the slot, does not provide any protruberances or other portions that extend beyond the geometrical confines of the chuck body. The chuck jaws preferably have two slight longitudinal grooves 17 formed in the surface.

On the underside of each chuck jaw are a pair of recesses 18 each located so that it will align with one of the radial passages passing through the chuck body. Each of these recesses is designed to receive the head of a pin or follower 19 which is slidably arranged to reciprocate within each of the passages 16. The recess not only provides a way of receiving the head 20 but it eliminates the need for machining or counterboring a hole for the head on the external surface of the chuck body while at the same time providing a positive means to prevent longitudinal motion of the chuck jaw relative to the chuck body. These features contribute to a more compact, light weight design which, in turn, is more easily handled and less awkward to use in actual operation.

There are two external peripheral or circumferential grooves 21 which extend completely around the chuck body and the chuck jaws. Each groove for all practical purposes is uninterrupted. Its purpose is to receive the resilient retaining ring 22 which is disposed in each groove. Also, each groove overlies one of the said passages 16 whereby the retaining ring is applying its force directly on top of and in opposition to the forces received through the chuck head.

Each retaining ring 22 is of resilient material and preferably is a ring of spring steel that is cut or split on one side. Within each groove 21 on the body is located a stop, preferably a dowel 23, against which one end of the retaining ring when of steel may be supported while the ring is further opened up, by pushing on the other end with a screw driver in connection with either installing or removing such rings.

Each of the rings 22 overlies the radial passage 16, at, respectively, the inner and outer ends of the respective jaws. Thus, the respective groups of inner and outer passages each lie in substantially the same radial plane relative to the spindle.

Centrally mounted within the stepped borehole 14 of the chuck body is the spindle 2 which is stepped down at places corresponding to the projection of the chuck pins into the borehole. As best seen in FIG. 1, the stepped spindle has on it a spindle bushing 25 or an integral surface which provides a tapered cam surface 26 that cooperates with the chamfered inner end of the pin at each location to drive the pins out or to retract them in response to reciprocating motion of the body along the spindle. There are two bushings shown, each of which tapers from a lesser inner diameter to a larger outer diameter. On each axial side of each tapered surface 26 is a collar or substantially cylindrical surface, the outermost collar being small enough in diameter that the innermost ends of the pins don't strike it. Also, in each case the inner or larger diameter adjacent tapered surface is substantially cylindrical so that, when the chuck body has moved axially on the spindle an appropriate distance, the jaws cannot expand beyond a certain point. In addition, the inner shoulders of the stepped borehole engage the faces of the bushings or of the stepped spindle to act as stops.

Although reciprocal motion is allowed between the spindle and the body, no relative rotational motion is permitted between the two. The preferred embodiment employs a key 27 mounted in a keyway 28 on the spindle 2 although a spline construction or some similar means may be used.

It is preferred to use spindle bushings 25 which are made of separate pieces and assembled, as by shrink fitting, to the stepped spindle 2. In that way the spindle bushings can be heat treated to be made sufficiently hard for the arduous type of service to which they are called while at the same time the more ductile or less brittle spindle member provides the necessary mechanical strength, resistance to shock, etc. It is, of course, possible to make the tapered surface integral with the spindle but I prefer the manufacture of the invention in the manner shown herewith.

A chuck end piece 30 is bolted by allen screw 31 to the outermost end of the spindle and has a frusto-conical circumferance which is faired into the slightly tapered surface 12 of the outer end of the chuck body.

Preferably, a detent assembly 32 is provided to hold the chuck body in the contracted jaw position. While any of several types of detent may be employed, I prefer a ball 33 and spring 34 which operates when the ball 33 snaps into a groove 35 in the outer end of the spindle. The ball and spring are held in place by a plug 36 which is shaped approximately as shown in FIG. 1 and advantageously may be screwed down through the tapped hole 37 in the chuck body until the spring tension (compression) is correct and the plug does not protrude from body 10.

Prior art expanding chucks have often suffered from failure of the jaws 3 under extreme conditions of acceleration, shock, etc. In order to reduce jaw failure, I have found it best to distribute the type of heat treatment used on the chuck jaw. It is case hardened on its outer corners 39 at least. I prefer to make each jaw of an air hardening tool steel and to harden only the sharp edges of the jaw 39, i.e., the top parts of the groove and the lower corners 39. The entire jaw should not be hardened.

Figure 2:
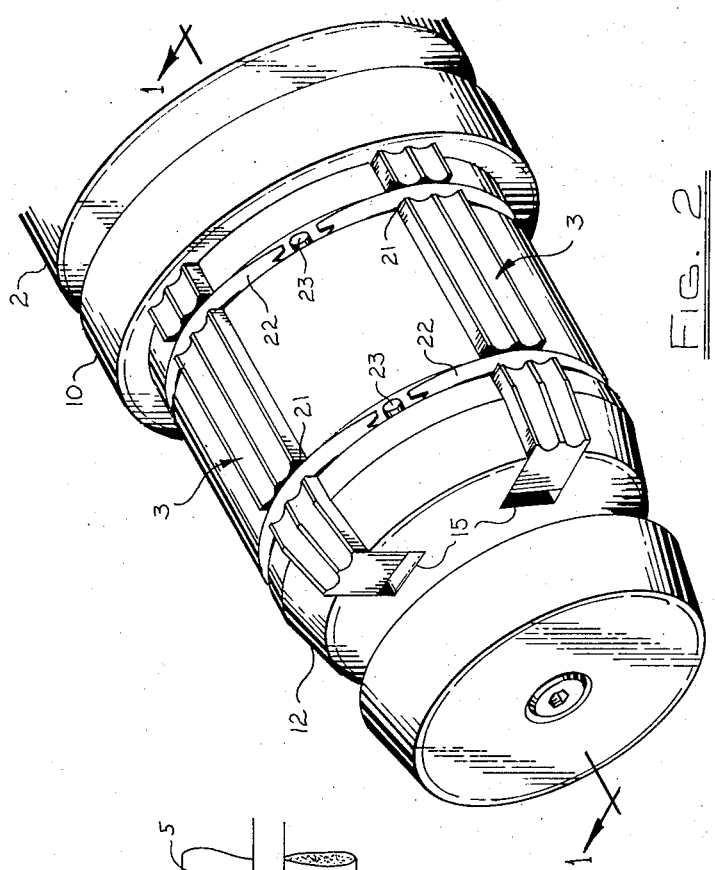
FIG. 2 is an isometric external view of an expanded mandrel.
Figure 3:
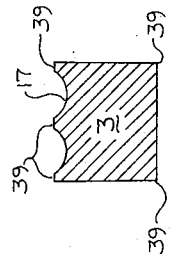
FIG. 3 shows a jaw cross section along 3—3 of FIG. 1.

As best seen in FIG. 1 top half when the chuck body is moved relative to the spindle or vice versa, the tapered surfaces 26 on the spindle bushings engage the chamfered ends of the pins causing the jaws to either expand or contract. For example, if the chuck body is moved to the right as seen in FIG. 1, the pins 19 are pushed outward by the tapered surfaces and the jaws expand to the extent that they rise up out of the grooves (FIG. 2) and thereby are forced against the adjoining core or other hole in which the chuck has been inserted. Conversely, movement of the chuck body in the opposite direction (left FIG. 1 see bottom half) permits the pins to be pushed by the force of the retainer rings into the borehole as they slide down the inclined surface of their respective cams.

The invention claimed is:

1. An expandable chuck or mandrel comprising a chuck body that has an external substantially cylindrical surface, has an internally stepped but substantially circular borehole that decreases in diameter as it approaches the outermost or unsupported end, has a plurality of substantially equally spaced longitudinal jaw slots interrupting said external surface and a plurality of substantially radial passages each extending from one of said slots to said borehole;

each chuck jaw further having on its underside at least one recess aligned with and larger than one of said passages;

a pin with an outwardly located head or enlarged end and an inner chamfered end slidably supported in each of said passages, the head being received in said jaw recess and larger than said passage, the shank extending through said passage and having a chamfered end thereon; and, a stepped spindle reciprocably mounted within said borehole having adjacent each pin chamfered end a tapered surface connected on each axial side to a cylindrical surface.

2. An expandable chuck according to claim 1 wherein said chuck body and said jaws have a continuous groove extending circumferentially on said external surface and overlying said passages which latter are disposed in substantially the same radial plane.

3. An expandable chuck according to claim 2 further comprising a retaining ring of resilient material is in said groove.

4. An expandable chuck according to claim 3 wherein said retaining ring is a ring of spring steel cut or split on one side.

5. An expandable chuck according to claim 4 further comprising a dowel in said groove and one side of said cut or split is supported thereagainst.

6. An expandable chuck or mandrel according to claim 1 where said chuck jaws has outer corners which have been selectively hardened by heat treatment, the entire jaw not having been hardened.

* * * * *